United States Patent [19]
Shimokawa et al.

[11] Patent Number: 5,333,649
[45] Date of Patent: Aug. 2, 1994

[54] PLUG FOR BLOCKING A BRANCHED PIPE OPENING

[75] Inventors: Shinji Shimokawa, Osaka; Katsuo Kita, Kadoma, both of Japan

[73] Assignee: Ashimori Kogyo Kabushiki Kaisha, Osaka, Japan

[21] Appl. No.: 953,289

[22] Filed: Sep. 30, 1992

Related U.S. Application Data

[63] Continuation of Ser. No. 566,454, filed as PCT/JP89/00013, Aug. 24, 1990, abandoned.

[51] Int. Cl.⁵ .................................. F16L 55/16
[52] U.S. Cl. ........................... 138/89; 138/92; 138/94; 138/98
[58] Field of Search ............... 138/89, 94, 98, 92; 220/213, 307, 352, DIG. 1, DIG. 19; 411/456

[56] References Cited

U.S. PATENT DOCUMENTS

| | | | |
|---|---|---|---|
| 602,743 | 4/1898 | Glidden | 138/98 |
| 645,502 | 3/1900 | Carpenter | 138/98 |
| 4,262,701 | 4/1981 | Beacom | 138/94 |

*Primary Examiner*—James E. Bryant, III
*Attorney, Agent, or Firm*—Birch, Stewart, Kolasch & Birch

[57] ABSTRACT

An apparatus for blocking the openings of a branched pipe (2) in a branched portion of a pipeline (1) prior to lining the inner surface of the pipeline (1) with a tubular lining material (100) for maintenance/repair or reinforcement purposes includes a spring-biased plug-housing assembly which carries a plurality of plugs for blocking the branch pipe openings. The plugs are installed one at a time into the branch pipe openings and are retained in the openings by a friction fit. The plug-housing assembly dispenses one plug at a time without the possibility of inadvertent dispensing of the remaining unused plugs. The plugs have cut-away portions in the outer periphery thereof, which cut-away portions cooperate for storage and installation purposes with struts on the plug-housing assembly.

4 Claims, 5 Drawing Sheets

PLUG FOR BLOCKING A BRANCHED PIPE OPENING

This application is a continuation of application Ser. No. 07/566,454 filed as PCT/JP89/00013, Aug. 24, 1990, now abandoned.

BACKGROUND OF THE INVENTION

1. Field of the Invention

This invention relates to techniques for applying a lining material to the inner surface of a pipeline such as a gas conduit, a city water pipeline, a sewer conduit, a conduit in which power cables or communication cables are laid or a petroleum pipeline and particularly an underground pipeline, for the purposes of maintenance, repairs and/or reinforcement.

2. Description of Related Art

Methods of applying a lining material to the inner surfaces of such pipelines or conduits have been used for the purposes of maintenance, repairs and/or reinforcement of various kinds of conduits such as inserting the lining material into a pipeline while the lining material is being turned inside out by the action of fluid pressure, pressing the evaginated surface of the lining material against the inner surface of the pipeline through the action of the above-mentioned fluid pressure, and adhesively bonding the inner surface of the lining material onto the inner surface of the pipeline.

However, in case such a lining method is applied to a pipeline having one or more branched portions to line the inner surface thereof, at the initial stage the lining material is adhesively bonded onto the whole inner surface of the pipeline, and as a result, the openings of the branched pipes formed in the main pipeline also become covered by the lining material, i.e., blocked thereby. At the next or second stage, the lining material layer covering the openings of the branched pipelines is removed by boring the same by means of a borer to thereby enable the branched pipes to communicate with the main pipeline. Upon effecting such a lining operation, if at the above-mentioned initial stage the lining material is adhesively a borer at the above-mentioned second stage, this thick solidified adhesive layer has to be removed, and such removal operations are difficult. To avoid such difficulties, upon effecting adhesive bonding of a lining material onto the inner surface of a main pipeline at the initial stage of the lining operation, the openings of branched pipes in branched portions have been covered with sealing materials prior to conducting the lining material bonding operation. Upon boring the portions of the lining material layer covering the openings during the above-mentioned second stage, the above-mentioned sealing material is then removed together with each of the bored-out portions of the lining material.

An apparatus for blocking openings of branched pipes in branched portions with sealing materials in the above-mentioned operation is described in Japanese Laid-Open Patent Application No. SHO 62-16127. This apparatus comprises a base, on which sealing materials or plugs for blocking openings of branched pipes in branched portions of a pipeline are placed, the base being mounted on an operating machine that is movable through the pipeline, in such a manner that it may be rotated about the longitudinal axis of the pipeline and also moved radially within the pipeline.

This apparatus is disadvantageous in that, since it can carry only one piece of sealing material or plug at a time, each time one of the openings of the branched pipes has to be blocked with a plug, the whole apparatus itself needs to be removed from the pipe in order to place thereon a separate plug for use in blocking the next opening.

Stating this disadvantage in more detail, in general, most of the various kinds of conduits and pipelines such as the above-mentioned gas conduits, city water pipelines and sewers, etc. have a plurality of branched pipelines extending therefrom in the regions close to the terminal ends thereof. For example, low pressure pipelines of gas conduits are buried in the ground under city roads to supply city gas through branched pipelines to neighboring houses and buildings. Many branched pipelines extend from a main pipeline at short intervals. Further, this situation applies also to city water pipelines and sewer conduits.

If the apparatus described in the above-mentioned Japanese Laid-Open Patent Application No. SHO 62-16127 is used for a pipeline having a plurality of branched pipes extending therefrom at short intervals between them, each time one of the openings of the branched pipes has to be blocked with a plug, an extremely inefficient operation of removing the apparatus from the pipeline and placing thereon a new plug for blocking the next opening has to be carried out.

The main object of the present invention is to provide a novel apparatus for use in a pipeline having branched pipes which is free from the above-mentioned disadvantages in the prior art apparatus.

SUMMARY OF THE INVENTION

A first object of the present invention is to provide an improved apparatus for blocking each of the openings of branched pipelines formed in branched portions of a main pipeline, by using a plug. Further, the present invention has for its second object to provide an efficient plug for use in blocking the openings of such branched pipes.

According to the present invention, there is provided a plug for blocking the a branched pipe opening from an interior of the pipe This plug is characterized in that it comprises a disc-shaped body having an outer peripheral flange of a diameter slightly larger than an inside diameter of said opening, a projecting portion formed on a side of said disc-shaped body facing an interior of the pipe, said projection portion being shaped so as to engage with an inner peripheral edge of said opening via frictional force and, a convex portion formed within the outer peripheral flange of said disc-shaped body and of a smaller diameter than a diameter of said opening, on a side opposite to the side on which said projecting portion is formed and the convex portion extending toward the interior of said pipe, and all the disc-shaped body and the projecting portion are formed integrally of a plastic material.

According to the present invention, there is provided a plug having a construction which will be described below.

This plug is characterized by incorporating the following requirements (1), (2) and/or (3).

(1) The above-mentioned disc-shaped body shall have a spherical, convex portion formed integrally on the surface thereof on the opposite side of the surface provided with a projecting portion.

(2) The above-mentioned disc-shaped body shall have a sealing member which is adhesively bonded onto the surface thereof provided with the projecting portion and which extends circumferentially of and around the projecting portion.

(3) The above-mentioned disc-shaped body shall have a curved shape which is the same as that of the inner surface of the main pipeline in each of the branched portions to be blocked with the plugs.

BRIEF DESCRIPTION OF THE DRAWINGS

The apparatus of the present invention will now be described hereinbelow with reference to the accompanying drawings, in which:

FIG. 2A is a central, longitudinal sectional view of the blocking apparatus;

FIG. 2B is a perspective view of the blocking apparatus;

DETAILED DESCRIPTION OF THE PREFERRED EMBODIMENTS

Figure 1:
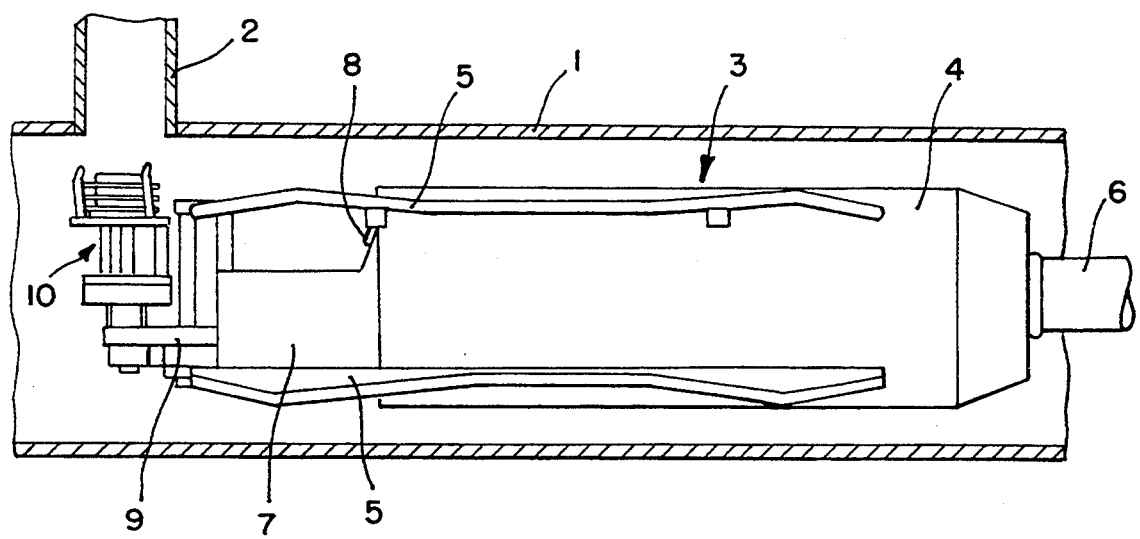
FIG. 1 is a side elevational view showing the relationship between the blocking apparatus of the present invention and the whole operating machine.

FIG. 1 shows the relationship between a blocking apparatus 10 of the present invention and the whole operating machine 3.

Operating machine 3 is adapted to be inserted into a pipeline 1, having a branched pipe 2 extending therefrom, and slidably moved therethrough by a slide 5 mounted on the operating machine body 4 when a rod 6 or wire or the like connected to the rear portion of the body 4 is pulled.

The operating machine body 4 has a turning unit 7 mounted on the front portion thereof in such a manner that it may be rotated about the longitudinal axis of the pipeline 1 relative to the body 4. The rotation of the turning unit 7 is accomplished by well-known mechanisms such as are used on the remotely controllable travelling robot disclosed in U.S. Pat. No. 4,648,454. See in particular, column 3, line 63, through column 4, line 9, and FIGS. 4a and 4b of this reference. The turning unit 7 has a television camera 8 mounted thereon.

Further, the front portion of the turning body 7 has a movable member 9 mounted thereon in a manner such that the movable member 9 it may be slidably moved vertically relative to the turning Unit 7; that is; radially of the pipeline 1. This radial movement of movable member 9 is also accomplished by well-known mechanisms such as are used in U.S. Pat. No. 4,648,454. See in particular, column 4, lines 53–59, and FIGS. 1, 5 and 6 of this reference. The arrangement is made such that all of the movement of the operating machine 3 through the pipeline, turning of the turning unit 7 relative to the body 4, and the sliding movement of the movable member 9 relative to the turning unit 7 can be remotely controlled outside of the pipeline while monitoring images picked up by the television camera 8. The blocking apparatus 10 is mounted on the movable member 9 for inserting plugs into branched pipes 2.

Figure 2A:
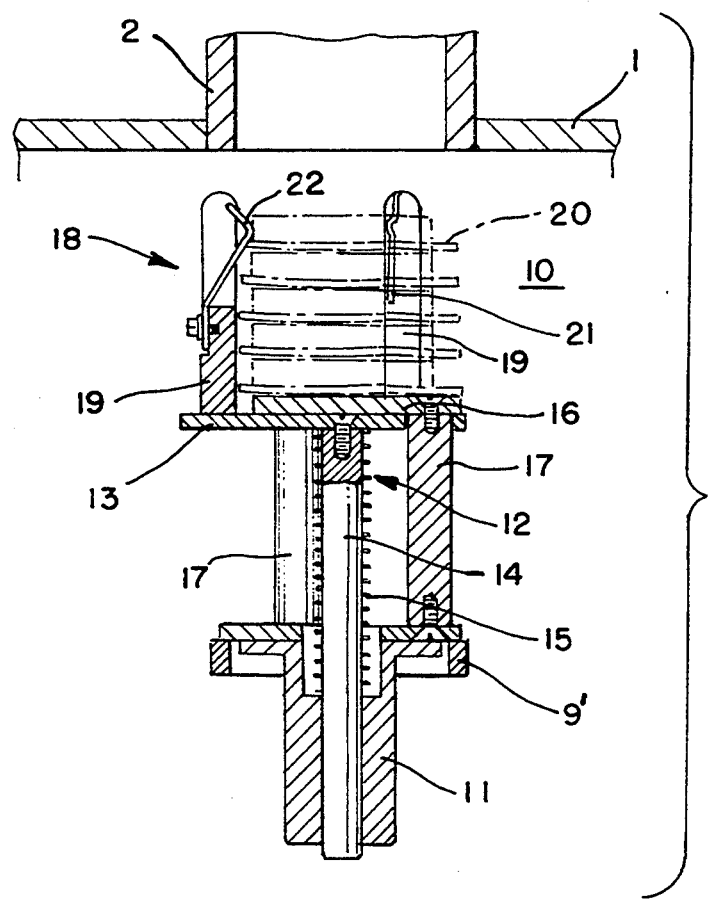
FIGS. 2A and 2B show the blocking apparatus of the present invention in an operative condition.
Figure 2B:
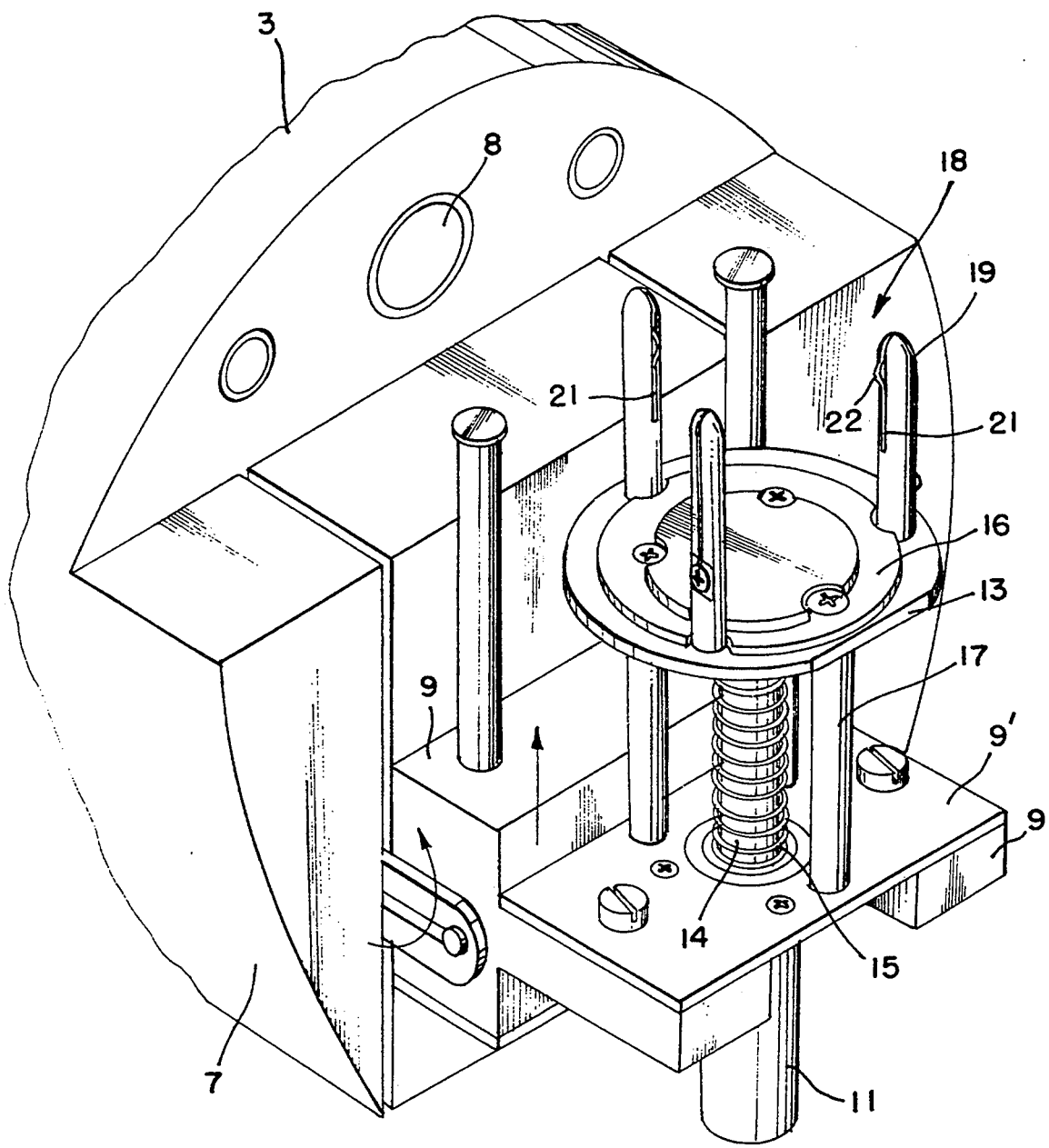

As shown in FIGS. 2A and 2B, a base 11 is detachably mounted through a plate 9' on the movable member 9 and fixedly secured thereto in such a manner that it may be moved together with the movable member 9 as an integral unit thereof.

A sliding member 12 comprises plate 13 and a sliding rod 14. The sliding rod 14 is supported in the above-mentioned base 11 so as to move slidably in the vertical direction relative to the base 11. Further, the sliding member 12 is normally biased by a spring means 15 upwards relative to the base 11.

A plate 16 is placed on the upper surface of the plate 13 and fixedly supported by struts 17 extending through the plate 13, relative to the base 11. Thus, the sliding member 12 is biased upwards by the spring means 15 so that the upper surface of the plate 13 is pressed against the plate 16.

Further, the sliding member 12 has a plug housing member 18 formed on the upper part thereof. The plug housing member 18 comprises the plate 16 and a plurality of struts 19 which stand upright around the plate 16. The arrangement is made such that a stack of of plugs 20 can be accommodated in the space defined by the struts 19 and held thereby. And, the plate 16 constitutes the bottom of the plug housing member 18.

As shown in FIG. 2B, each of the above-mentioned struts 19 has a slit 21 formed in the upper half portion thereof in which a wire spring 22 is fitted. A portion of each of the wire springs 22 projects inwardly to resiliently hold the plugs 20 accommodated along the struts 19.

Figure 3:
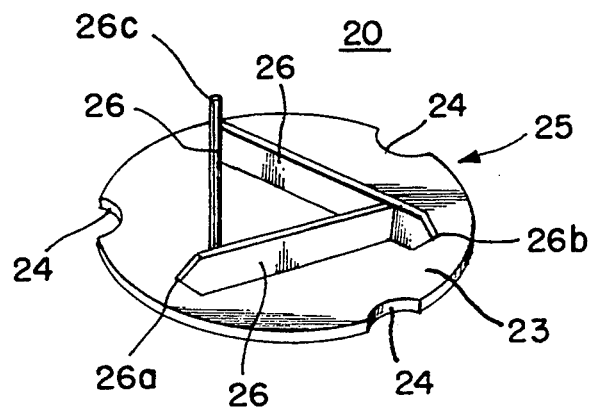
FIG. 3 is a perspective view showing one embodiment of the plug according to the present invention.

The plug 20 has such a shape as shown in FIG. 3, and is formed integrally of a plastic material. This plug comprises a disc-shaped body 23 whose diameter is slightly larger than-the inside diameter of the branched pipe 2 to be blocked by the apparatus of the present invention. This disc-shaped body 23 has a plurality of cut-away portions 24 formed along the peripheral edge thereof at regular intervals so that each of the struts 19 of the plug housing member 18 of the blocking apparatus can fit loosely into in each of the cut-away portions 24. Further, the disc-shaped body 23 has a projecting portion 25 formed on the upper surface thereof and which has such a shape as to be fitted tightly in the inner surface of the branched pipe 2. In the embodiment shown in FIG. 3, the projecting portion 25 is formed by three pieces of strip-shaped ribs 26 assembled with one another. The leading end of each of the ribs 26 projects outwardly so as to define the apex of a triangle thus forming tapered pressure contact portions 26a, 26b and 26c. The arrangement is made such that the extreme ends 26a, 26b and 26c are engageable with the inner surface of the branched pipe 2 and held tightly in the end of the opening of the branched pipe 2 formed in the main pipeline.

While in this embodiment the projecting portion 25 is formed by three pieces of ribs 26 assembled in a triangular shape, it may be formed in any desired shape provided that it has such a configuration as to be engageable with the inner surface of the branched pipe 2 at the branched portion through the action of a frictional force.

FIGS. 5A, 5B, 5C and 6 show alternate embodiments of the improved plug of the present invention.

Plugs 31 and 31' are each formed integrally of a plastic material and comprise disc-shaped bodies 32 and 32', respectively, which have a diameter slightly larger than the inside diameter of the branched pipe 2 and also have cut-away portions 33 formed along the periphery of their bodies. Further, as the cut-away portions 33 are formed to accommodate the above-mentioned blocking apparatus, it is not always indispensable to form the cut-away portions 33 in terms of the function of the plug for use in blocking a branched pipe at a branched portion.

Further, each of the above-mentioned disc-shaped bodies 32 and 32' has a projecting portion 34 formed on the upper surface thereof and having such a shape as to be fitted tightly into the inner surface of a branched pipe. Thus, in FIGS. 5A, 5B and 5C, the projecting portion 34 has a substantially hexagonal shape in plan view. The projecting portion 34 has pressure contact portions 35 formed at positions corresponding to three apexes of the hexagon so that they can be engaged tightly with the inner surface of a branched pipe through the action of a frictional force exerted between them.

Further, each of the disc-shaped bodies 32 and 32' has a spherical, convex portion 36 formed in the central area of the lower surface thereof.

Moreover, each of the above-mentioned disc-shaped bodies 32 and 32' has a sealing member 37 of an elastomer such as rubber adhesively bonded onto the upper surface thereof and around the outer periphery of the projecting portion 34. The upper surface of the sealing member 37 is applied with an adhesive or binder.

Figure 6:
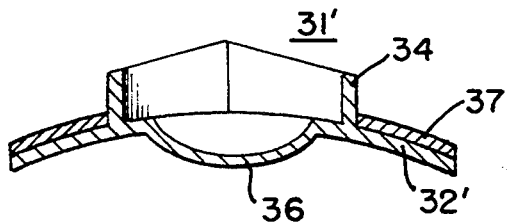
FIG. 6 shows a further alternate embodiment of the plug of the present invention.

FIG. 6 is a sectional view of another embodiment of the plug having an improved shape. This plug has a disc-shaped body 32' having a curved shape which is the same as that of the inner surface of a main pipeline in a branched portion to be blocked. The above-mentioned projecting portion 34 is formed on the curved surface on the opposite side of the convex portion.

As shown in FIG. 2, when the blocking apparatus 10 of the present invention is in its inoperative condition, the sliding member 12 occupies its upper position relative to the base 11, and the plate 13 is abutted against the lower surface of the plate 16 by the resilient force of the spring means 15. Thus, the struts 19 project upwardly above the plate 16 to a maximum extent. In FIGS. 2A and 2B, a plurality of plugs 20 are accommodated in the plug housing member 18.

Since the plugs 20 are held by the wire springs 22, they are fixedly secured in the plug housing member 20 so that even when the blocking apparatus 10 is inclined or directed laterally or downwardly from its position shown in FIGS. 1, 2A and 2B, according to the connecting position of the branched pipe 2, there is no risk of the plugs 20 dropping out from the plug housing member 18.

The operation of this blocking apparatus is carried out as follows.

The operating machine 3 with a plurality of plugs 20, 31 or 31' accommodated in the plug housing member 18 of the blocking apparatus 10 is inserted into the pipeline 1 and moved therethrough by operating the rod 6 or the like, while the operator is viewing the inside of the pipeline 1 by means of the television camera 8 to search for the opening of the branched pipe 2.

The position of the operating machine 3 is adjusted by the operator while viewing the image on the screen of the television camera 8, and as occasion demands the turning unit 7 is turned so as to locate the blocking apparatus 10 at the position of the opening of the branched pipe 2.

When the apparatus 10 is located below the opening of the branched pipe 2, the movable member 9 of the operating machine 3 is moved upwards in the drawing so that the base 11 fixedly secured to the movable member 9 is moved upwards and is accompanied by upward movement of the sliding member 12.

The leading ends of the struts 19 first contact the leading end face of the branched pipe 2. When the movable member 9 is moved further upwardly from that condition, the sliding member 12 cannot be moved upwards because the leading ends of the struts 19 are held by the leading end face of the branched pipe 2 around the opening. Thus, the base 11 is moved upwards relative to the sliding member 12 while compressing the spring means 15 so that the plate 16 fixedly secured to the base 11 is moved upwardly away from the plate 13. As a result, the group of plugs 20 resting on the plate 16 is pushed up along the struts 19.

Figure 4:
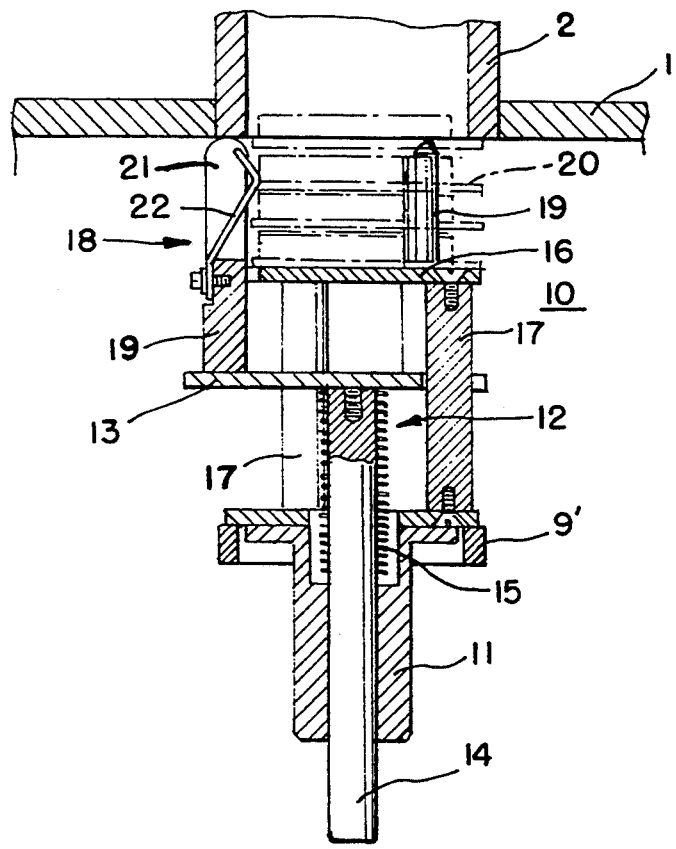
FIG. 4 is a central, longitudinal sectional view of the blocking apparatus of the present invention in operative condition.

The plugs 20, 31 or 31' are moved upwards while spreading the wire springs 22 mounted on the struts 19, respectively. Thereupon, the projecting portion 25 or 34 of the uppermost plug is fitted into the inner surface of the opening of the branched pipe 2 so that the projecting portion is engaged with the inner surface of the branched pipe 2 and held thereby. Thus, the plug is held at the branched portion so as to cover the opening of the branched pipe 2 by the disc-shaped body. This condition is illustrated in FIG. 4.

When the movable member 9 is moved down subsequently, only the base 11 is moved down together with the plate 16 while the leading ends of the struts 19 remain pressed against the leading end face of the branched pipe 2. When the plate 16 abuts against the upper surface of the plate 13, the sliding member 12 is also moved down so that the whole blocking apparatus is returned eventually to its initial condition as shown in FIG. 2.

Then, out of the group of plugs accommodated previously in the plug housing member 18, the uppermost plug remains to be held in the opening of the branched pipe 2, and the rest of the plugs accommodated in the plug housing member 18 will be moved down together with the sliding member 12.

The opening of one of the branched pipes is blocked with the plug by the above-mentioned operation. Subsequently, the operating machine 3 is moved in turn to each of the openings of the branched pipes where the same operation is repeated, so that one plug is fitted into turn in each of the openings of branched pipes 2 thus blocking the openings. Therefore, by inserting the operating machine 3 once into the pipeline 1, the openings of branched pipes corresponding in number to the plugs accommodated in the plug housing member 18 can be blocked.

Figure 7:
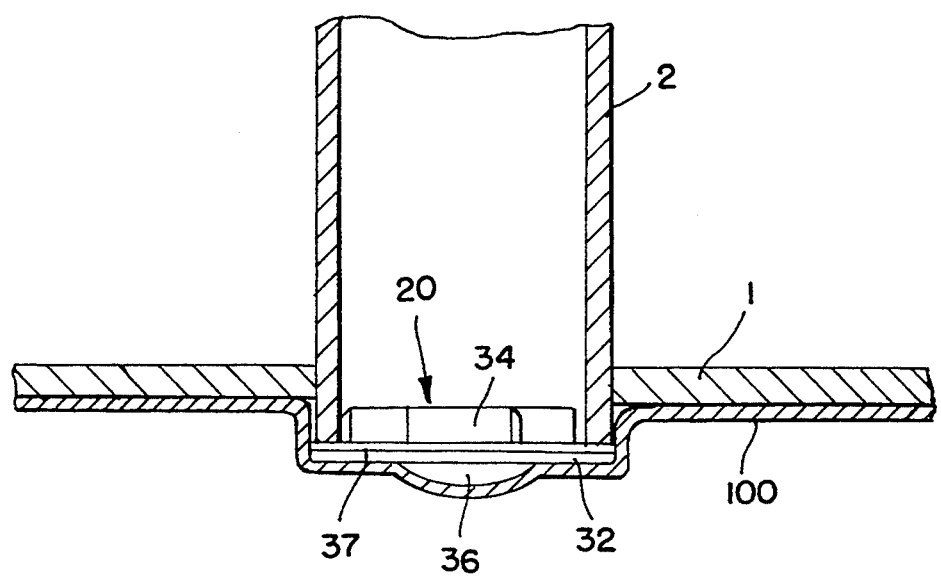
FIG. 7 is a central, longitudinal sectional view showing the condition of the pipeline in the lengthwise direction after completion of lining operation wherein the opening of the branched pipe in the branched portion of the main pipeline is fitted and blocked with the plug shown in FIGS. 5A, 5B and 5C.
Figure 8:
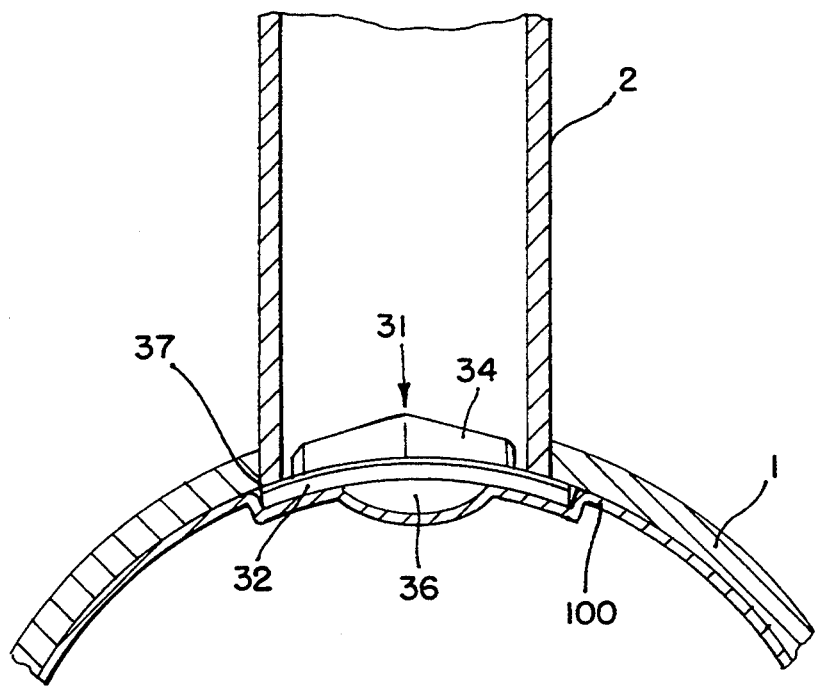
FIG. 8 is a cross-sectional view of the branched portion of the main pipeline after completion of lining operation wherein the opening of the branched pipe is fitted and blocked with the plug shown in FIG. 6.

After all of the openings of branched pipes in the pipeline 1 have been blocked, the inner surface of the pipeline 1 is lined with a lining material according to a known method. The condition of the pipeline which has been lined is illustrated in FIGS. 7 and 8.

After the completion of the lining operation, the base 11 is removed from the movable member 9 mounted on the turning unit 7, and then a proper boring device is mounted onto the operating machine 3 in place of the blocking apparatus 10. Then, the operating machine 3 is inserted again into the lined pipeline. Subsequently, by driving the boring device, only the portions of the lining material adhesively bonded on the inner surface of the pipeline covering each of the openings of branched pipes are removed together with the plug 20, 31 or 31'. Thus, communication is restored between the branched pipes 2 and the pipeline 1. As a boring device for use in boring the lining material covering the branched portions of the pipeline various kinds of constructions using a drill, a striker or a heating iron are proposed. If, for example, it is desired to burn off the lining material covering the openings of the branched pipes by using a heating-iron type borer, then an EVA resin whose melting point is low should preferably be selected, because this resin can be readily bored, and can seal the periphery of holes formed in the lining material layer.

Further, if a plug having a convex portion 36 formed in the central, lower surface thereof like the plugs 31 and 31' shown in FIGS. 5A–5C and 6 is used, and the inner surface of the lined pipeline is observed by the operator by means of the television camera 8, the projecting condition of the lining material layer 100 at the position of the opening of the branched pipe 2 can be easily confirmed through its image on the screen of the television camera. Therefore, it is convenient to use such a type of plug to find the location of the opening.

Further, by using a plug with an abraded lower surface, an enhanced adhesion can be achieved between the lower surface and the lining material layer 100 so that leakage of fluid after the boring operation can be prevented.

In the condition shown in FIG. 7, the leading end of the branched pipe 2 projects inwardly from the inner surface of the pipeline 1, and the end face thereof is generally planar. In such a case, a plug having a flat-plate type disc-shaped body 32 as shown in FIGS. 5A, 5B and 5C is used, and the branched portion can be blocked with this plug by engaging it with the inner surface of the branched pipe 2.

Figure 5A:
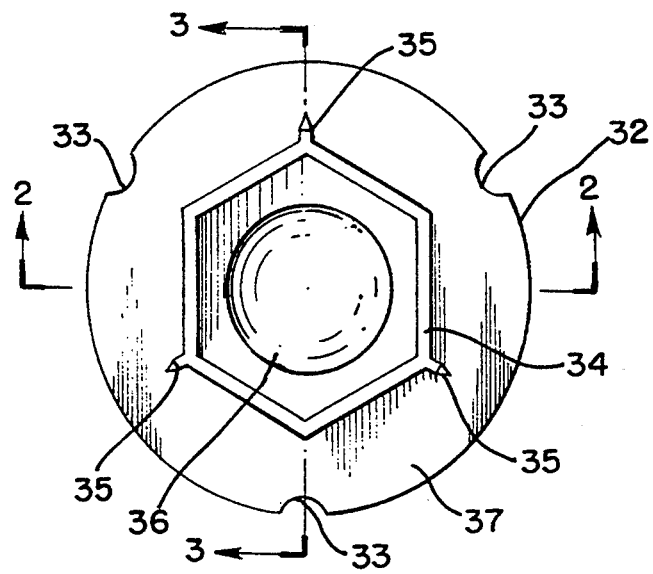
FIG. 5A is a plan view of an alternate embodiment plug of the present invention.
Figure 5B:
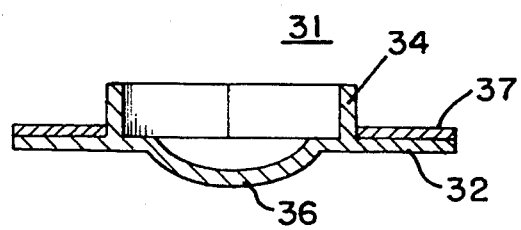
FIG. 5B is a sectional view of the plug taken along line II—II in FIG. 5A.
Figure 5C:
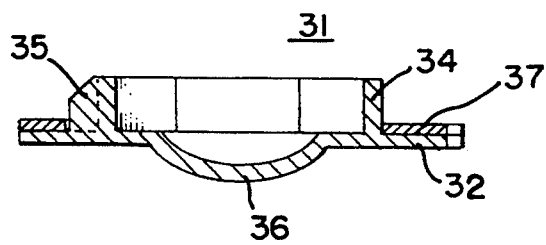
FIG. 5C is a sectional view of the plug taken along line III—III in FIG. 5A.

Whilst, in case the inner end of the branched pipe 2 is cut flush with the inner surface of the pipeline 1 as shown in FIG. 8, or in case the branched pipe 2 is welded to the periphery of a bored hole in the pipeline 1, the opening of the branched pipe cannot be blocked satisfactorily with the plug as shown in FIGS. 5A–5C. In such a case, a plug having a curved disc-shaped body as shown in FIG. 6 is used, and this plug is fitted in the branched portion along the inner surface of the pipeline 1.

According to the blocking apparatus of the present invention, since the inner surface of the pipeline 1 is lined with a lining material and the openings of branched pipes in branched portions of the pipeline 1 have previously been blocked satisfactorily with plugs, there is no risk of the adhesive used for bonding the lining material flowing into the branched pipe 2 and resulting in formation of a thick solidified adhesive layer which impedes boring operation in the branched pipe 2. Therefore, in the subsequent process of boring the lining material covering the openings of branched pipes, it is sufficient to remove only the thin lining material and the plugs 20, 31 or 31' by boring, and so the lining material covering the openings can be bored easily in a short time.

Further, since the plug housing member 18 can accommodate a plurality of plugs, when the operating machine 3 is once inserted into the pipeline 1, a plurality of openings of branched pipes can be blocked continuously with the plugs, and so operational efficiency can be improved significantly.

The plug according to the present invention can be fitted into the opening of a branched pipe very easily by a simple operation to block the branched portion of a pipeline, and after fitting there is almost no possibility of the plug dropping out of the plug housing member.

Further, since the plug according to the present invention has a sealing member 37 bonded onto the upper surface thereof, even if the inner surface of the branched portion is somewhat irregular, the plug is pressed tightly against the inner surface along the irregularities through deformation of the sealing member 37, so that the branched portion can be sealed satisfactorily.

Further, as mentioned hereinabove, when a plug having a sealing member 37 applied with an adhesive or binder on the upper surface thereof is used, drop-out of the plug while blocking the opening of a branched pipe is prevented, and the branched portion can be sealed satisfactorily, thus preventing the ingress of adhesive into the branched pipe.

As a result, there is no possibility of formation of a thick solidified adhesive layer in the branched pipe, which would impede the subsequent boring operation.

Further, since the projecting portion 35 of the plug is of such a shape as to be fitted properly into the branched pipe, the branched portion can always be blocked securely with the plug.

Furthermore, after completion of the lining operation the position of the branched portion can be found easily and exactly by viewing the image of the convex portion 36 formed on the lower surface of the disc-shaped body on the screen of the television camera, which offers convenience to the operation of boring the lining material covering the openings of branched portions.

What is claimed is:

1. A plug for blocking a branched pipe opening from an interior of the pipe, comprising:
   a disc-shaped body having an outer peripheral flange of a diameter slightly larger than an inside diameter of said opening;
   a projecting portion formed on a side of said disc-shaped body facing an interior of the pipe, said projecting portion being shaped so as to engage with an inner peripheral edge of said opening via frictional force; and
   a convex portion formed within the outer peripheral flange of said disc-shaped body and of a smaller diameter than a diameter of said opening, on a side opposite to the side on which said projecting portion is formed and the convex portion extending toward the interior of said pipe, said projecting portion and said convex portion being formed integrally of a plastic material.

2. The plug for blocking a branched pipe opening as claimed in claim 1, wherein the outer peripheral flange portion of said disc-shaped body has a sealing member which is adhesively bonded onto the side on which said projecting portion is formed, said sealing member extending circumferentially of and around said projecting portion.

3. The plug for blocking a branched pipe opening as claimed in claim 1, wherein the outer peripheral flange portion of said disc-shaped body has a curved shape which is the same as that of an inner surface of said pipe.

4. The plug for blocking a branched pipe opening as claimed in claim 1, wherein said disc-shaped body has cut-away portions formed in an outer periphery of the outer peripheral flange.

* * * * *